May 22, 1973  F. D. FINCHAM  3,734,705
METHOD AND APPARATUS FOR PRODUCING AND PACKAGING
SEALED TUBULAR GLASS BODIES
Filed April 9, 1971  10 Sheets-Sheet 1

INVENTOR.
FREDERICK D. FINCHAM
BY E. J. Holler &
Charles S. Lynch
ATTORNEYS

INVENTOR.
FREDERICK D. FINCHAM

May 22, 1973  F. D. FINCHAM  3,734,705
METHOD AND APPARATUS FOR PRODUCING AND PACKAGING
SEALED TUBULAR GLASS BODIES
Filed April 9, 1971  10 Sheets-Sheet 6

INVENTOR.
FREDERICK D. FINCHAM
BY E. J. Holler &
Charles S. Lynch
ATTORNEYS

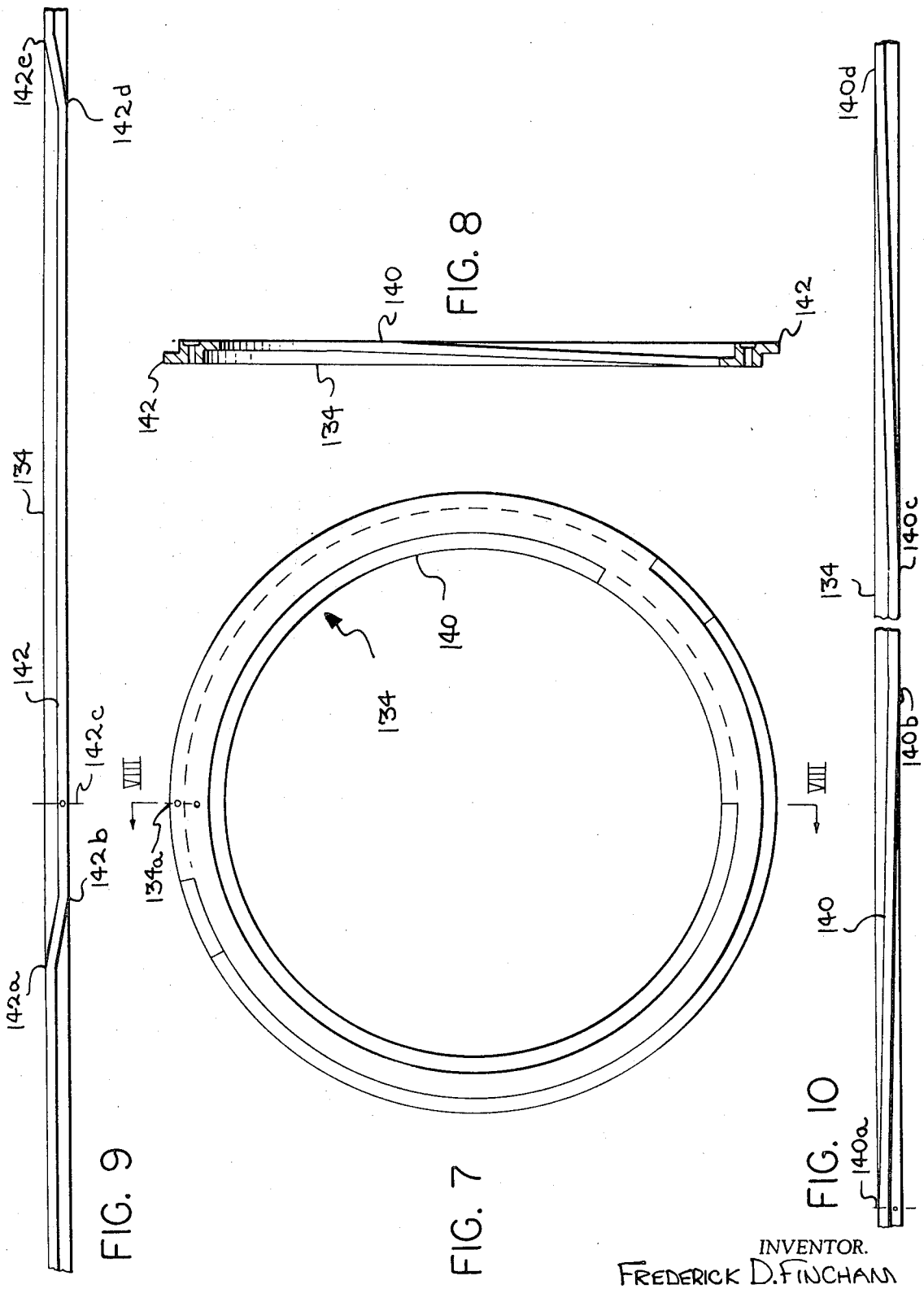

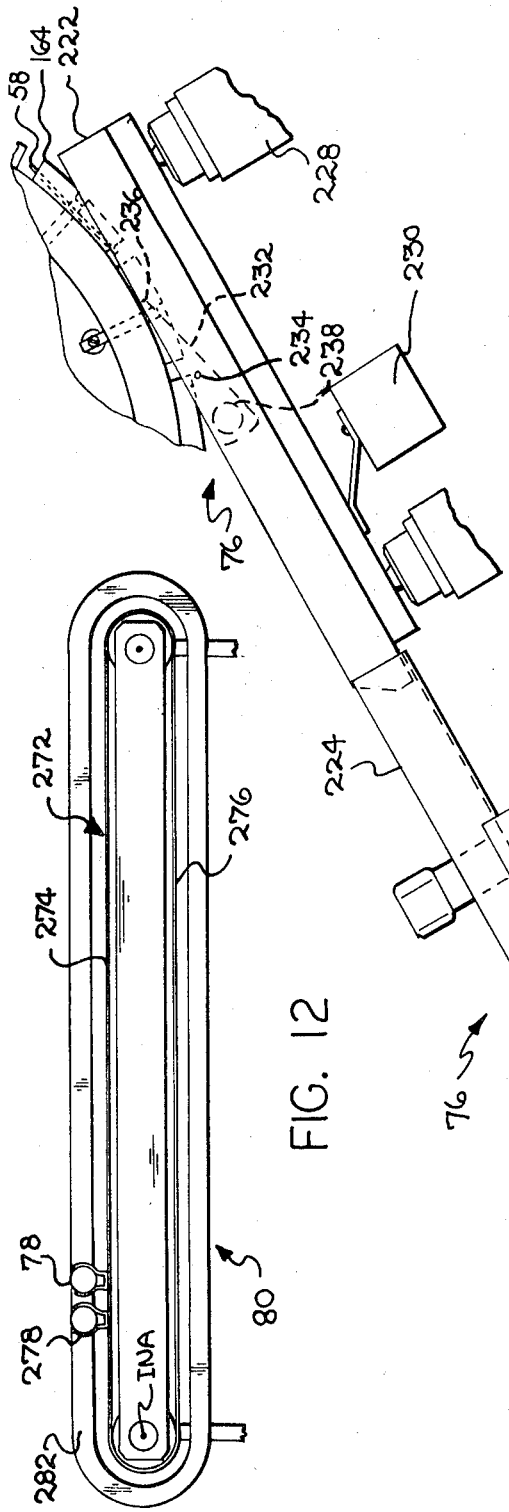
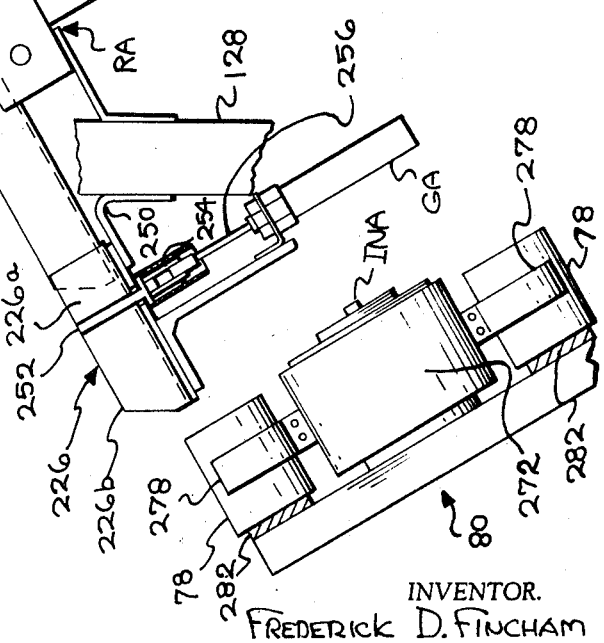

United States Patent Office 3,734,705
Patented May 22, 1973

3,734,705
METHOD AND APPARATUS FOR PRODUCING AND PACKAGING SEALED TUBULAR GLASS BODIES
Frederick D. Fincham, Monclova, Ohio, assignor to Owens-Illinois, Inc.
Filed Apr. 9, 1971, Ser. No. 132,720
Int. Cl. C03b 15/18
U.S. Cl. 65—87
30 Claims

ABSTRACT OF THE DISCLOSURE

Method and apparatus for automatically producing and packaging sealed sections of thermoplastic tubing, such as glass tubing. Spaced localized zones, of a length of tubing held in an arcuate path to exert a bending moment on the tubing, are heated to melt the tubing at each zone to enable the tubing to separate at the zones into individual sections as the bending moment on the tubing pulls the tubing apart. The tubing is clamped in the arcuate path intermediate the localized zones to enable each tubing portion end to exert a bending moment independent from the bending moment exerted by the other end of the tubing portion. The clamped individual tubing sections are then released and directed to a packaging area.

BACKGROUND OF THE INVENTION

Gas turbine regenerators may be made from a plurality of small tubes, i.e. tubes having an internal diameter of 0.1 inch or less. A parallel group of such tubes which are sealed at their opposite ends are united by confining them laterally and then raising their temperature until the material entrapped within each tube expands to force its wall against the adjacent tubes. In the case of thermally crystallizable glasses, the assembled tubes are heated to thermally crystallize them to glass-ceramics, essentially simultaneously with the sealing operation. As the temperature is raised, if the internal pressure within the tubular sections is sufficient, the walls of the thermoplastic tubing will be expanded until the walls of adjacent tubular sections are fused together.

Initially the sealed tubular sections were made by hand. It was then discovered that the severing and sealing operation in making sealed tubular sections could be accomplished continuously and mechanically if the tubing was subjected to tensile forces during the cutting and sealing operation. In this method a vertical orientation of the tubing was utilized to gravitationally produce the required tensile forces. The flame of a cutting burner was directed against the moving length of tubing, and the tubing and the burner were advanced concurrently until the combined actions of the burner and the tensile forces result in the severing and sealing.

The above method was a substantial advance in that it enabled the automatic production of such tubular sections by the application of tensile forces in the cutting and sealing operation. However, it is desirable to be able to produce shorter lengths of sealed tubular sections than would be possible when gravitational forces alone were supplying the tensile force required for severing and sealing. It is further desirable to increase the production speed over that attainable when depending upon gravitational forces for the tensile stressing. In addition, it is also desirable to be able to cut and seal short lengths of tubing having very, very small diameters and thus less weight to be acted upon by gravitational forces.

Accordingly, it is an object of this invention to provide a new and improved method and apparatus for producing sealed sections of thermoplastic tubing.

It is a further object of this invention to provide an improved method and apparatus for automatically and continuously producing sealed sections of thermoplastic tubing from the operation of drawing the tubing to packaging the individual sealed sections.

It is a further object of this invention to provide an improved method and apparatus for producing sealed sections of thermoplastic tubing which can automatically produce shorter lengths and process smaller diameters of tubing at a faster rate than heretofore possible.

SUMMARY OF THE INVENTION

In carrying out the above objects the invention features a cutting and sealing wheel having a peripherally extending tube receiving surface. A plurality of burner heads are carried by the wheel and positioned to provide an outwardly extending flame at spaced localized zones of tubing on the peripheral surface. The tubing is advantageously clamped when in the arcuate path on the wheel at intermediate positions between the heating zones. Since these clamping positions are remote from the ends of each tubing portion, the bending moment exerted by guiding the tubing portion in an arcuate path permits the individual tubing section ends to snap or pull away from the peripheral surface when heated and melted, thereby exerting the tensile force required for the best cutting and sealing operation.

Means are shown for moving the burner heads into tube heating positions adjacent the tubing after the tubing is in place on the peripheral surface of the wheel, and for moving each burner head out of tube heating position after the tubing has been severed by the burner head. The tubing may be continuously drawn from a heated body of thermoplastic material and fed to the cutting and sealing wheel. The cutting and sealing wheel is then rotated continuously to accept the continuously supplied length of tubing. The tubing may be conducted in a looped path from the drawing station to the cutting wheel. The height of the looped path may be monitored to obtain a measure of the drawing speed of the tubing. The motor driving the cutting wheel may be controlled by signals indicating the speed of the pulling wheels at the drawing station, which control may be refined and adjusted by the monitoring of the looped path which is obtaining a measure of the actual drawing speed of the tubing.

The diameter of the tube may be measured or gauged after drawing and the signal obtained from the diameter measurement may be utilized to control the speed of pulling roll means at the drawing station to increase or decrease the drawing speed of the pull rolls to maintain the diameter of the tubing within a desired tolerance range. Further, the signal from the diameter measuring may be utilized for rejecting tubing sections when the diameter of the tubing is outside of a desired range of acceptable diameters.

The individual sealed sections of thermoplastic tubing are collected as they are released from their clamped position on the cutting wheel and conveyed to a packaging area. A finger may be disposed adjacent the peripheral tube receiving surface of the wheel for deflecting the individual sections from the wheel to a tube chute conveyor. The tube chute conveyor has a chute section which is operable in response to the detection of an incorrect tubing diameter for diverting tubing sections to a waste area. Individual containers for receiving the tube sections to form a package are indexed into a tube receiving position at the end of the tube chute conveyor. A gate in the tube chute conveyor temporarily holds back tube sections while the container conveyor is indexing a full package out of a tube section receiving position and indexing an empty container into tube receiving position.

Other objects, advantages, and features of this invention will become apparent when the following description is taken in conjunction with the accompanying drawings, in which:

FIG. 7 is a side elevational view of a double track cam of the wheel illustrated hereinbefore;

FIG. 8 is a cross-sectional view of the double track cam illustrated in FIG. 7;

FIG. 9 is a flattened layout of the clamping finger cam track on the outer periphery of the cam illustrated in FIG. 7;

FIG. 10 is a flattened layout of the burner head cam track on the inner periphery of the cam illustrated in FIG. 7;

FIG. 11 is a side elevational view of a three-section tube chute conveyor and a cross-sectional view of a container conveyor for receiving the tube selections from the chute conveyor;

FIG. 12 is a view of the container conveyor mechanism taken from the right side of that illustrated in FIG. 11.

This invention involves the production of sealed tubular sections of thermoplastic material which may be utilized in manufacturing regenerators for gas turbine engines, but also find utility in manufacturing other products, such as nozzle for a Fisher burner, heat and sound insulation material, and the like.

Figure 1:
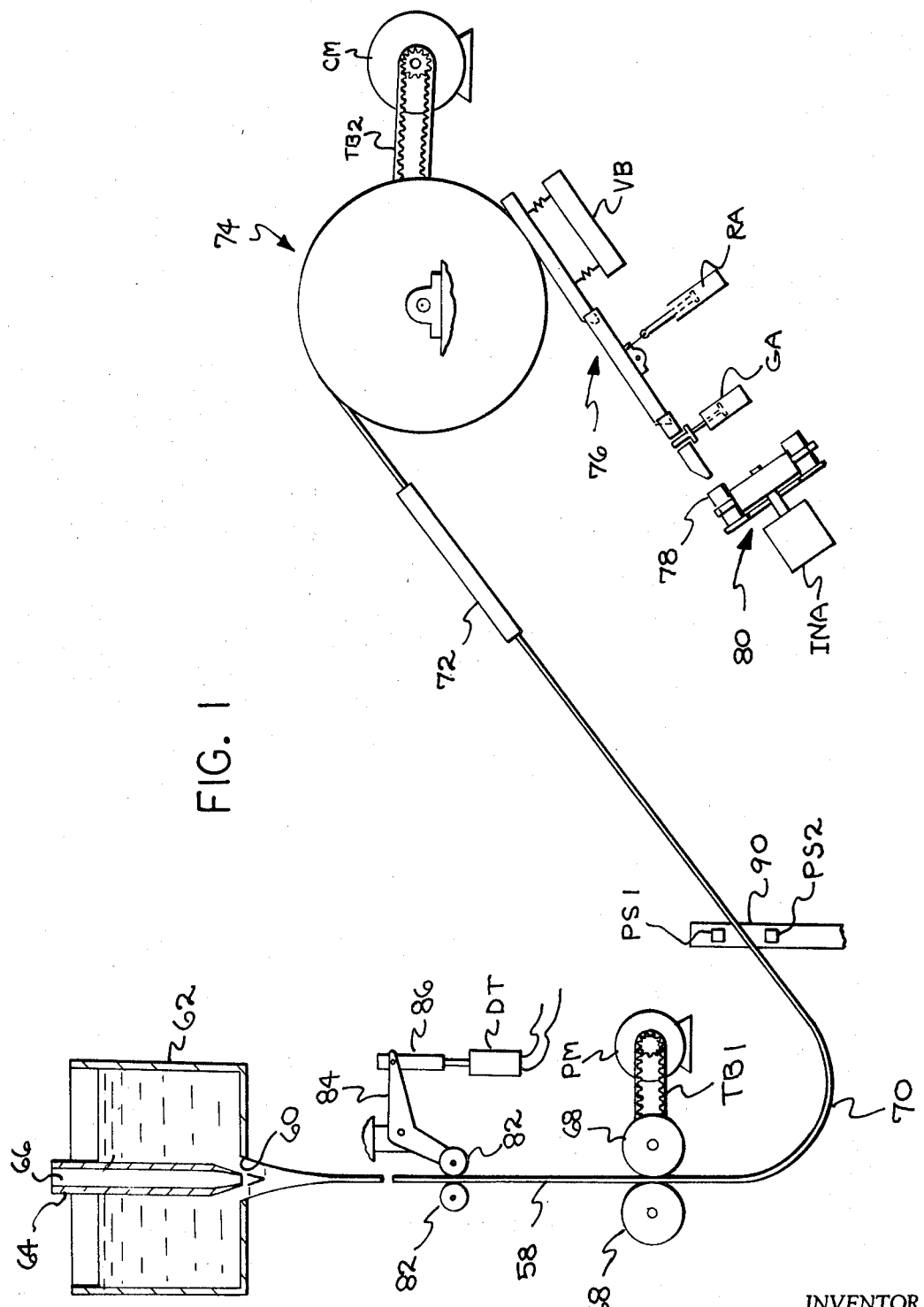
FIG. 1 is a diagrammatic view of apparatus for continuously producing individual sealed sections of thermoplastic tubing which embodies the teachings of this invention.

Referring now to FIG. 1, there is shown a continuous length of tubing 58 being formed by drawing glass downwardly through an annular opening or orifice 60 located in a lower wall of a heated vessel 62 which may be the feeder section of a furnace. The center of the annular opening 60 is defined by a mandrel 64 which has a longitudinal passage 66 communicating at one end with pressure and volume controlled atmosphere and at the other end with the interior of the formed glass tubing.

A pair of drawing or pulling rollers 68 are driven via a timing belt TB1 by a pulling motor PM. The tubing 58 is conducted in a looped path 70 by a tubing guide 72 and onto the outer periphery of a wheel of a cutting and sealing mechanism indicated generally at 74. The wheel of the cutting and sealing mechanism 74 is driven via a timing belt TB2 connected to a wheel motor CM.

A tube chute system is indicated generally at 76. A first section of the chute system receives the sealed tubes from the mechanism 74 and directs them toward a packaging area. A vibrator VB advantageously is connected to the first chute section to insure movement of the sealed tubes through the chute system. A second section of the tube chute is actuatable about a pivot by a reject actuator RA to divert sealed tubes to a waste area when the diameter of the tubing being formed is not within a tolerance range.

A third section of the chute system includes a gate which is actuatable into and out of a position for temporarily holding back the tubing sections when a container 78 becomes filled with tubing sections and the conveyor 80 is indexing an empty container into tube receiving position. An index actuator INA may be used to move the containers as required.

FIGS. 2 through 10 illustrate in detail the novel cutting and sealing apparatus of this invention. To enable the best understanding of the mechanism 74 the overall apparatus is described in its assembled form, with specific reference being made to particular components separately to clarify the operation of the completely assembled form.

Figure 5:
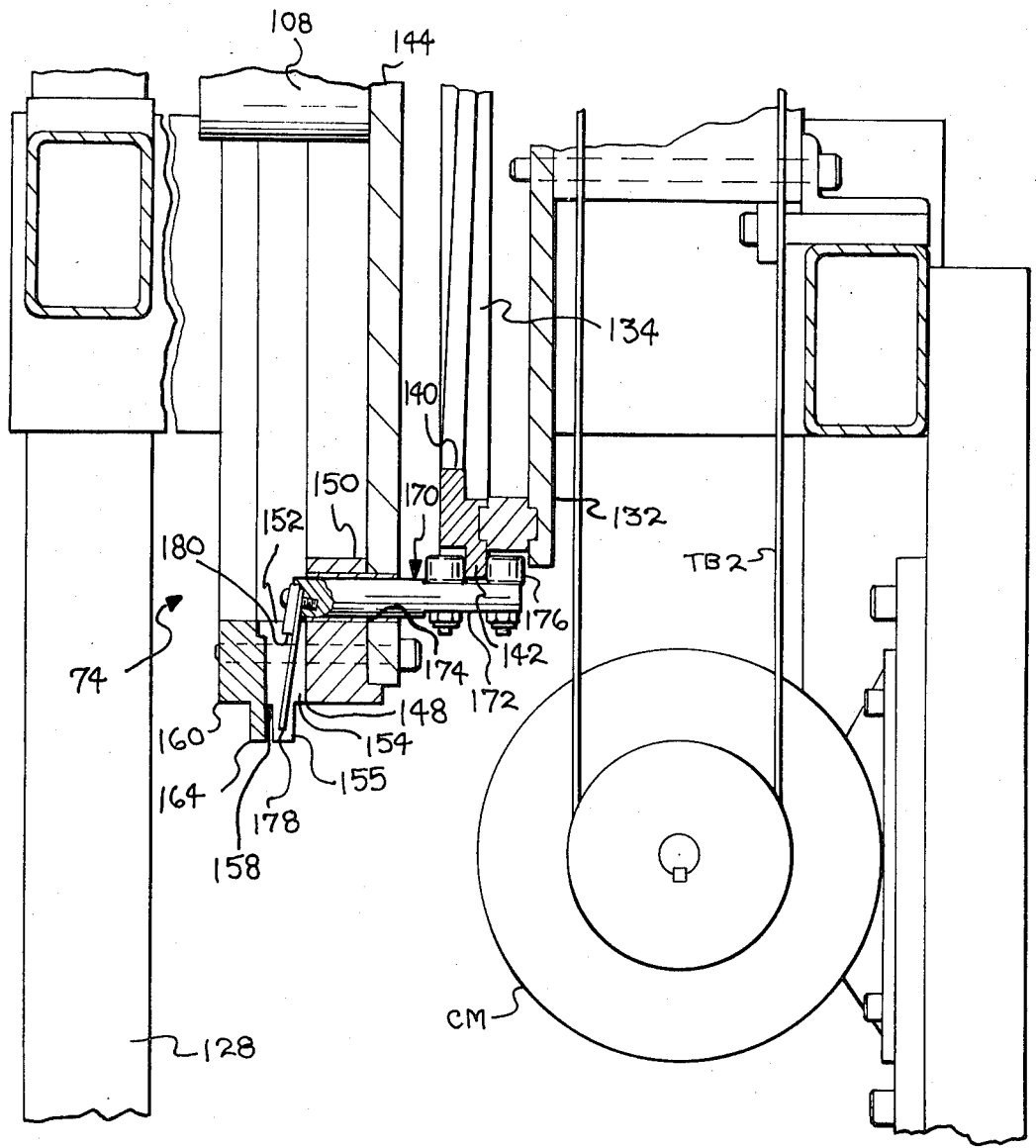
FIG. 5 is a cross-sectional view of the wheel illustrated in FIG. 3, taken along lines V—V.
Figure 6:
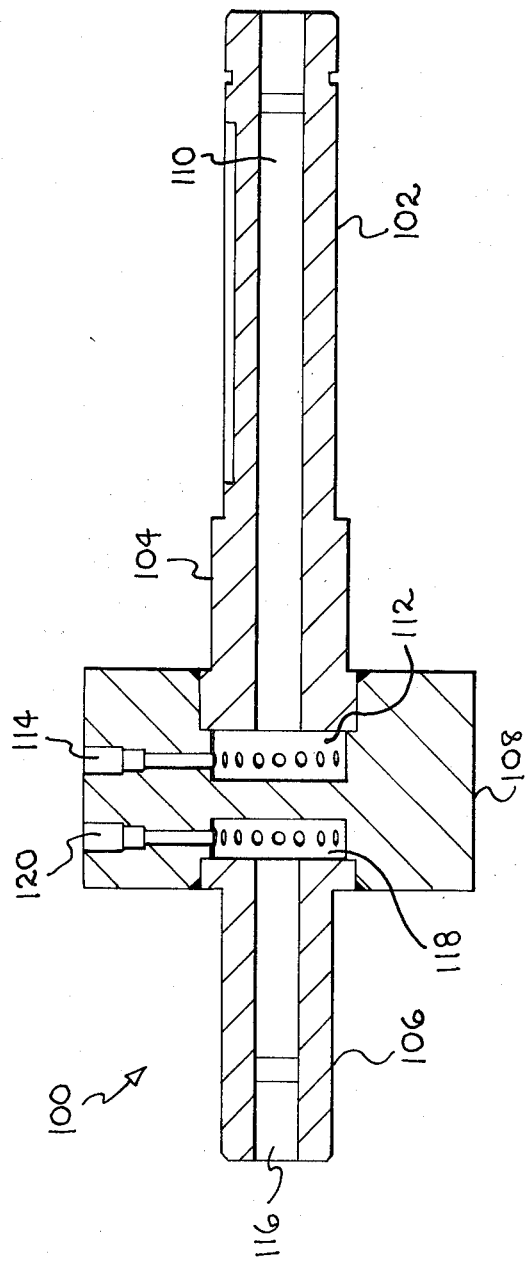
FIG. 6 is a cross-sectional enlarged view of the wheel supporting shaft.

Referring initially to FIG. 6 there is illustrated the supporting and driving shaft assembly 100 of the rotary wheel portion of the cutting mechanism 74. The shaft 100 has a first land 102 for connection to the driving motor CM. A second land 104 functions to center and support a drive plate 144 (best seen in FIGS. 4 and 5). A third land 106 is provided on the shaft assembly 100 for journally supporting the wheel of the mechanism 74 on the frame 128. A feeder and torch connection support 108 for the individual torch assemblies is disposed intermediate the lands 104, 106 and extends radially toward the rim of the wheel.

An axial passage 110 is formed in shaft section 102 for connection through a rotating union 122 to a source of fuel or oxygen for the torch assemblies. A manifold 112 is provided in the feeder section 108 to direct the gas received from the passage 110 to a plurality of radially extending passages 114 to feed the individual torch assemblies.

An axial passage 116 is formed in shaft section 106. A manifold 118 formed in the torch assembly feeder section 108 provides communication between the axial passage 116 and a plurality of radially extending passages 120 to feed fuel or oxygen to the torch assemblies from a second rotating union 124.

Figure 2:
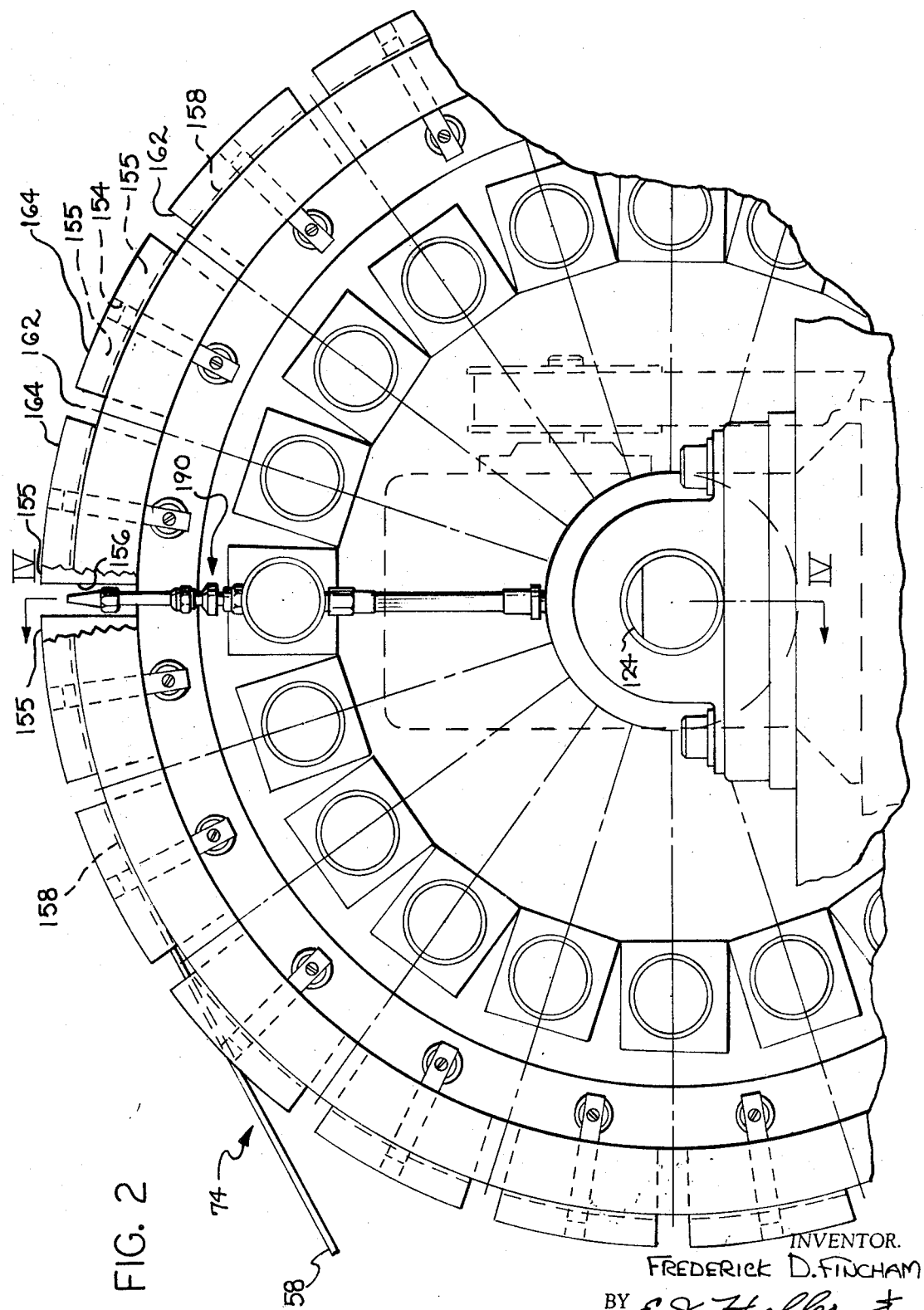
FIG. 2 is a side elevational view of the upper portion of a cutting and sealing wheel embodying the teachings of this invention.
Figure 4:
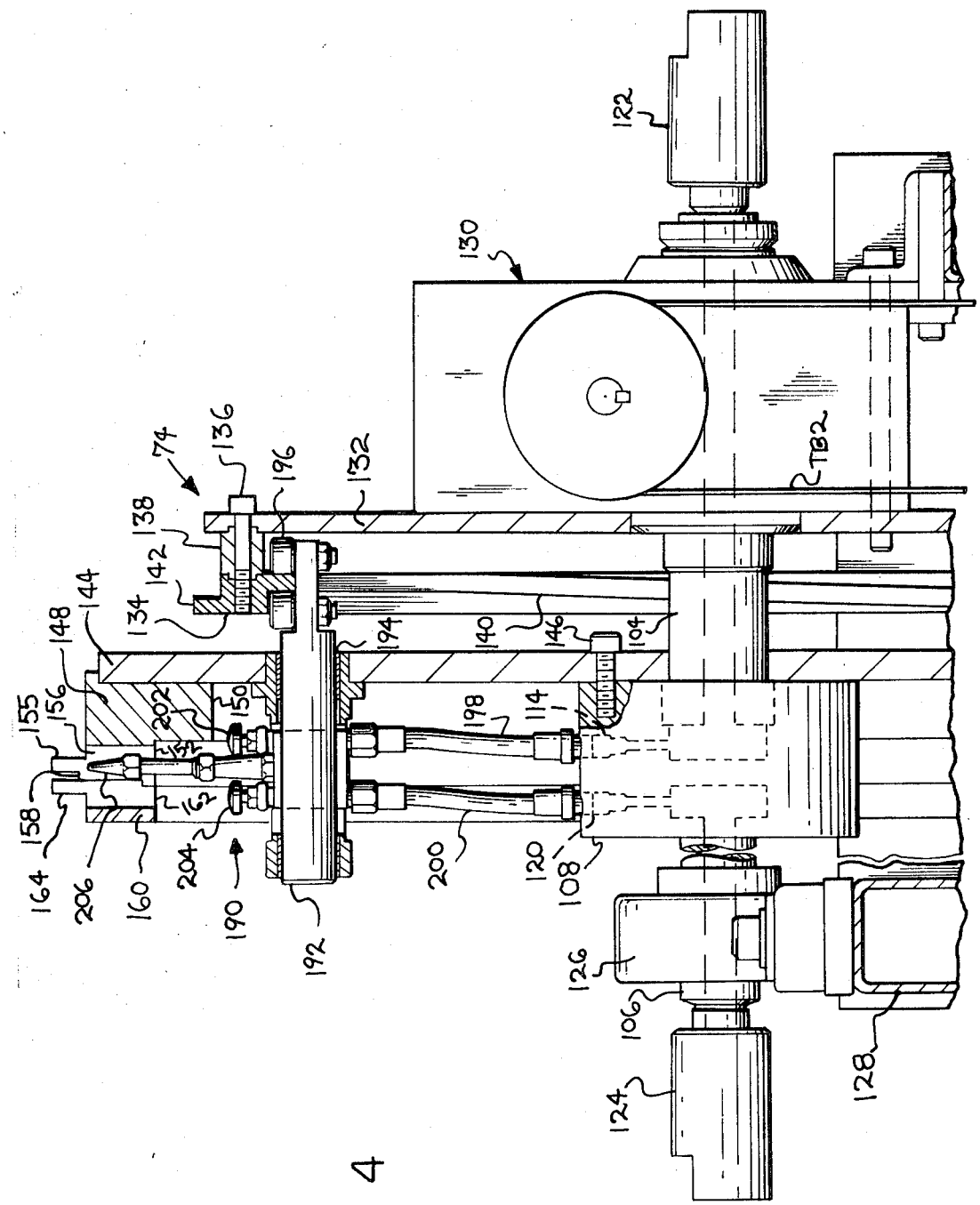
FIG. 4 is a cross-sectional view of the wheel illustrated in FIG. 2, taken along lines IV—IV.

Referring now to FIGS. 2 and 4 the land 106 of the shaft 100 is shown journally supported in a pillow block 126 mounted on the frame 128. A drive connection is made at 130 from the motor CM to the land 102 of the shaft assembly 100. A timing belt TB2 is connected between the motor CM and the drive connection means 130, which may be a reducer depending upon the speed of the motor CM and the desired speed of the rotating wheel portion of the mechanism 74.

An annular cam mounting plate is supported concentric with the shaft assembly 100 and is secured to the drive connection means 130. A double track cam 134 is supported by the cam mounting plate 132 via bolts 136 and spacers 138 to provide operating room for cam follower wheels to be described hereinafter. A first cam track 140 extends radially inwardly. A second cam track 142 extends radially outwardly.

A drive plate 144 is carried on land 104 and is secured to the gas distributing section 108 by bolts 146. An annular inner guide ring 148 is carried on drive plate 144 by suitable bolts.

The inner guide ring 148 has a first inner annular spacer section 150 to space a second annular outer section 152 from the drive plate 144 and to provide slidable support for the clamping finger holders to be described hereinafter. Slots 154 are formed in the outer section 152 of the guide ring 148 to accommodate clamping fingers. The slots 154 are formed between and define the ends of outwardly extending guide fins 155. Slots 156 are formed in the guide fins 155 intermediate the slots 154 to accommodate movement of the burner heads of each torch assembly. A tube receiving peripheral surface 158 is formed around the outer edge of the section 152 of inner guide ring 148 to provide a tube receiving surface which is interrupted at intervals by the clamping finger slots 154 and the burner head slots 156.

An outer guide ring 160 is carried on the same bolt or other fastening means which secures both of the guide rings 160 and 148 to the drive plate 144. Slots 162 are formed in the inwardly facing section of rim 160 which abuts the outwardly facing section 152 of ring 148. Slots 162 register with slots 156 formed in the inner guide ring 148 to permit movement of a burner head 206 across and underneath the peripheral guide surface 158. Guide fins 164 extend radially outwardly between the slots 162 adjacent the peripheral tube receiving surface 158. Thus, fins 164 and 155 define a channel for guiding the length of tubing to be cut and sealed onto the peripheral surface 158.

Figure 3:
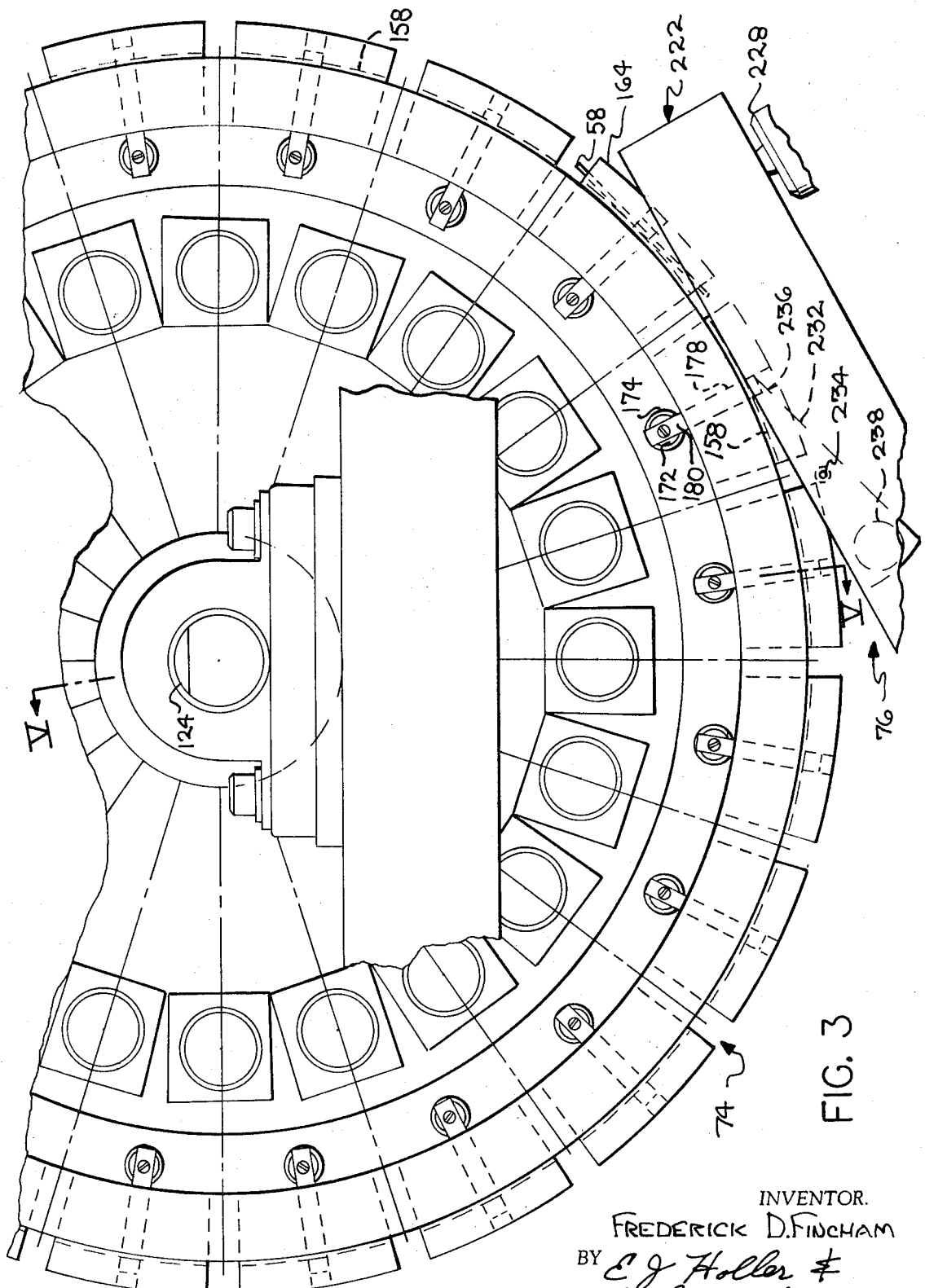
FIG. 3 is a side elevational view of a lower portion of the wheel illustrated in FIG. 2.

Referring to FIGS. 3 and 5 there is illustrated a clamping finger assembly indicated generally at 170 which comprises a holder 172 slidably supported in a bushing 174 carried in the drive plate 144 and section 150 of the inner guide ring 148. Cam follower wheels 176 are mounted on one end of the holder 172 and engage opposite sides of the clamping finger cam track 142. A leaf spring clamping finger 178 is secured to the other end of the holder 172 by a key 180.

Referring again to FIG. 4, there is illustrated a torch assembly generally indicated at 190 which includes a regulator holder 192 slidably mounted in a bushing 194 carried in the drive plate 144. Cam follower wheels 196 are mounted at one end of the holder 192 and engage opposite sides of the cam track 140. Flexible conduits 198 and 200 connect the regulator of the torch assembly to the distribution section 108 of the shaft 100. Adjustable valves 202 and 204 permit individual flame adjustment for each torch assembly 190. A burner head 206 is mounted for reciprocation in the slots 156, 162.

Operation of the cutting and sealing mechanism 74 can be most clearly understood by referring to the various views of the double track cam 134 illustrated in FIGS. 7 through 10. Although FIGS. 7 and 8 show the cam track in its actual form as it is utilized in the cutting mechanism assembly, the function of the specific tracks 140 and 142 may be more clearly understood by reference to the flattened sections of the tracks shown in FIGS. 9 and 10.

To provide a common reference point for FIGS. 7 to 10 a zero degree position has been selected and is illustrated at 134a in FIG. 7. Corresponding zero degree reference points 142c and 140a are shown in FIGS. 9 and 10 for cam tracks 142 and 140, respectively.

In a preferred embodiment of the invention, the tubing is guided into initial contact with the wheel of mechanism 74 at approximately 30° before the zero point noted at 134a. In FIG. 9 at point 142a, or approximately 30° before the zero point 142c, the cam track 142 is to the cam mounting plate 132 side of the cam 134. Therefore, the cam follower wheels 176, the holder 170, and the clamping finger 178 of a clamping assembly at point 142a are withdrawn, and the tubing can be guided onto the receiving surface 158 without interference.

As the wheel rotates on the shaft 100, the cam track 142 moves toward the tubing side of the cam 134, with respect to the same point on the rotating wheel, and thus urges a holder 172 and a clamping finger 178 toward the guide surface 158 through the cam follower wheels 176. At point 142b in FIG. 9 the holder has been moved toward the tubing a sufficient distance so that the leaf spring clamping finger 178 clamps the tubing on surface 158 between the finger 178 and the inner wall of the radial guide fin 164.

That tubing portion remains clamped from point 142b through the zero reference point 142c to point 142d of cam track 142 until after the burning and severing action has been completed. At point 142d the cam track 142 moves away from the tubing or drive plate 144 side of the cam 134 toward the cam mounting plate 132 side, with respect to the same point on the rotating wheel, and at point 142e has returned the clamping finger holder to a "clamp open" position. This enables reception of tubing 58 onto peripheral surface 158 whenever that finger comes up to the tube receiving position at approximately 30° before the zero reference point 142c of the cam track 142.

Referring to FIG. 10 it can be seen that the burner head cam track 140 remains adjacent the cam mounting plate side of the cam 134, with respect to the same point on the rotating wheel, until the zero reference position indicated at 140a. The clamping finger assembly has thus already operated and is securely holding the tubing before the torch assembly starts its movement and cutting operation. From the zero reference point at 140a, the cam track 140 moves in a regular path across the inner face of the cam 134 to a point indicated at 140b on the tubing side of the cam 134. Thus the burner head 206 is moved from slot 156 into slot 162 in a gradually sweeping motion which takes the burner flame across the tubing secured in place on the surface above the slots 156, 162 by clamping fingers on each side of the slots.

The burner head movement is preferably accomplished in about the first 120° of the cam 134 from the zero degree reference point at 134a. The flame from burner head 206 is now moved out of heating position with respect to the tubing and stays out of heating position until the tubing is released from the clamping fingers from the cutting and sealing mechanism 74. The cam track 140 starts to return at point 140c from the tubing side of the cam 134 to the cam mounting plate side indicated at 140d. This return also takes place in approximately 120° and the return of the burner head 206 to its starting position is accomplished before tubing is received on the cutting wheel assembly, that is, before 30° in advance of the zero reference point 140a.

It can thus be seen that the continuously drawn tubing is continuously received on the peripherally extending guide surface 158. Clamping fingers 178 are actuated into a clamping position by cam track 142 so that each portion of the tubing between the burners is securely held in position as it starts in its arcuate path of movement. The bending of the tubing by the arcuate path of movement around the peripheral surface 158 creates a bending moment in the tubing. As the burner heads 206 slowly sweep across the clamped tubing the tensile force exerted on each localized section of the tubing being heated causes the individual tubing sections to pull or snap away from each other and to seal without damaging the ends of the tube sections.

Referring now to FIGS. 11 and 12, there is shown a three-section tube chute conveyor indicated generally at 76 and having a first chute section 222, a second chute section 224, and a third chute section 226 with separated portions 226a and 226b.

The first chute section 222 is U-shaped and is supported by at least one vibration mount 228 and a vibrator unit 230. The vibrator unit 230 insures that the tube sections are correctly started on their downward path directed toward the container conveyor 80. A stripping finger 232 is pivotally supported at 234 in the chute 222 and has a tapered end 236 that rides adjacent to the peripheral surface 158 to deflect the tube sections away from the wheel after the clamping fingers release. The finger 232 advantageously carries a weight 238 in the end opposite to that which is tapered to insure that the tapered end 236 stays against the surface 158.

The second chute section 224 is also U-shaped and is wider in cross section than the U-shape defined by chute 222 so that the forward or lower end of the chute 222 can fit into the upper or rear end of section 224. The second section 224 is pivotally supported by a rotary actuator assembly designated at RA. The rotary actuator RA is responsive to a reject signal to tip the forward end of the section 224 up and the rear end down to divert out-of-diameter tubing sections to a cullet or waste area.

The third chute section 226 is supported by a bracket 250 secured to frame 128. The third chute section is also U-shaped and is wider in cross section than the U-shape of section 224 so that the forward end of the section 224 is received in the rear end of the section 226. The portion 226a of chute section 226 is separated from portion 226b by an extensible-retractable gate member 252. The gate member 252 is connected by a clevis assembly 254 to a rod 256 of an air cylinder GA which operates as a gate actuator.

Referring to FIGS. 11 and 12 there is shown in FIG. 11 a cross-sectional view and in FIG. 12 an elevational view of a container conveyor 80 which includes an endless belt or chain 272 having an upper run 274 and a lower run 276. Pairs of spaced spring clips 278 are carried by the endless belt or chain 272 and hold therebetween individual containers 78. The containers 78 are cylindrical and have an open end which is spaced toward the terminal end of the chute conveyor 76. The containers 78 are advantageously made from polypropylene or other plastic material which will not injure the tube sections received therein.

As best seen in FIG. 11 the container conveyor 80 is tilted so that the back of the containers 78 are slidably supported against a guide bar track 282 to receive tube sections from the chute conveyor 226. An index actuator INA is responsive to an indexing signal to move a container 78 into a tube section receiving position in front of the chute conveyor 76. When the container 78 is filled an index signal is provided which causes gate actuator GA to extend gate 252 between sections 226a and 226b of chute section 226 to temporarily block the passage of tube sections down the chute. The index actuator INA indexes a filled package or container 78 out of, while indexing an empty package or container 78 into, tube receiving position in front of the chute conveyor 76. Upon completion of the indexing movement the gate actuator GA retracts the gate 252 permitting the temporarily collected tube sections to slide into a container 78 and the filling of the container 78 by tube sections subsequently received by the chute conveyor 76.

Figure 13:
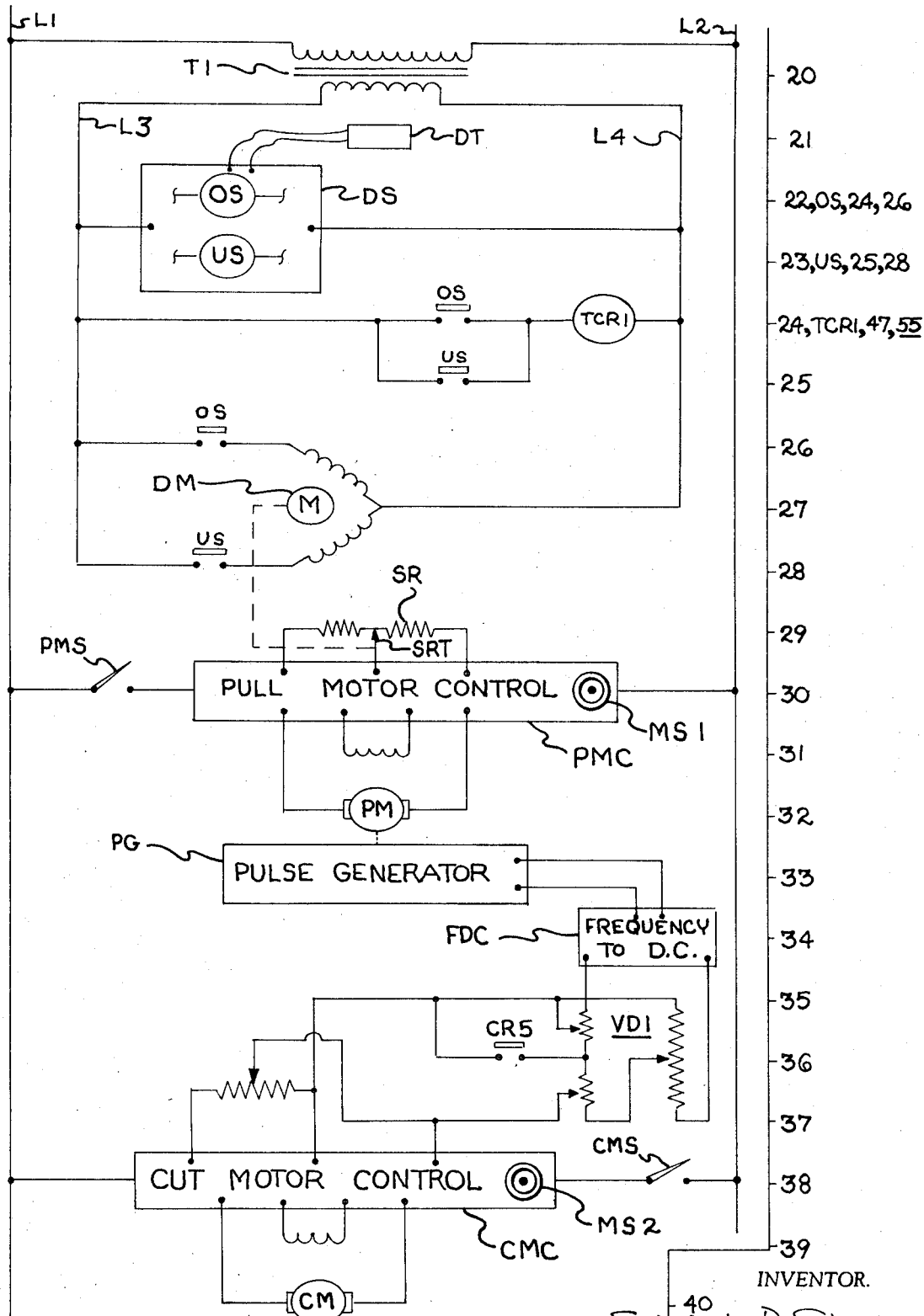
FIGS. 13 and 14 are schematic and diagrammatic illustrations of the controls utilized in practicing the teachings of this invention.
Figure 14:
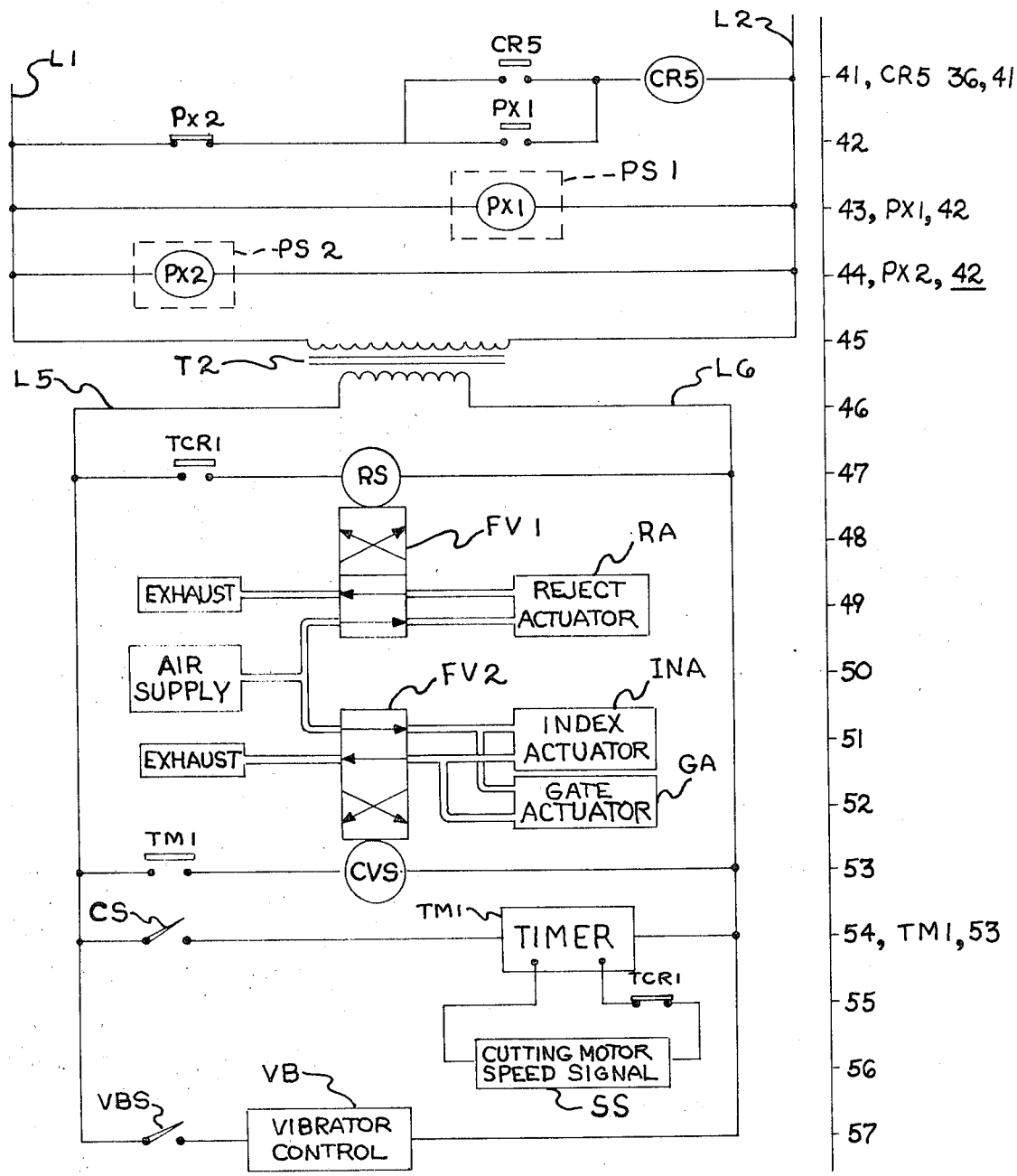

Referring to FIGS. 13 and 14 there is schematically and diagrammatically illustrated the controls for attaining the desired functions of this invention. It will be noted that the components have been laid out in line diagram form so that they can be readily located by reference to the line number where the component is positioned. Contact switching operations may be noted without designating a mechanical tie between the contacts and the actuating means. The contacts may be located at any convenient position, even though quite remote from their actuating means. Cross reference between the actuating means and its associated contacts is easily accomplished by noting in the right-hand margin of the drawing the reference character of the actuating means, for example time delay relay TCR1, adjacent line number 24, the line in which the contact actuating relay coil is located for energization. Following the reference character TCR1 are the line numbers in which the TCR1 contacts appear, i.e. 47, 55. A contact line number notation that is not underlined indicates that these contacts are normally open, as in line 47. A contact line number notation that is underlined indicates that those contacts are normally closed, i.e. as in line 55. Other actuating means and their associated contacts are similarly noted.

Referring back to FIG. 1 there is shown a pair of gauging wheel means 82 contacting each side of the tubing 58 to measure the diameter of the tubing being drawn. At least one of the gauging wheels 82 is connected through a pivot arm 84 to a shaft extension 86 of a core of a differential transformer DT. The transformer DT is set so that no output or a null is obtained when the sensor wheels 82 have sensed a correct diameter of the tubing. An oversize diameter will displace the core in one direction in the differential transformer DT providing a first output. An undersize diameter will displace the core of the differential transformer DT in a second direction providing a second output.

In FIG. 13 a transformer T1 connected to power leads L1 and L2 supplies control circuit voltage to leads L3 and L4. The differential transformer DT is shown in line 21 connected to supply the output therefrom to a diameter sensor signal unit DS in lines 22, 23. The diameter sensor DS has a first relay OS in line 22 which is energized when the diameter is oversize and a second relay US in line 23 which is energized when the diameter is undersize.

Upon energization of the oversize relay OS, contacts OS are closed in line 26 to energize a first field of a diameter control motor DM in line 27. The shaft of the diameter control motor DM is connected to move a movable tap SRT on a signal resistor SR in line 29. The speed signal which is applied to the pull motor control PMC in line 30 is thus changed to increase the pulling speed and reduce the diameter of the tubing until it is back within tolerance and the relay coil OS is deenergized.

The pull motor control PMC is energized by closing switch PMS in line 30 connecting the control PMC to power leads L1 and L2. The pull motor control PMC may be manually set by adjustment of control knob MS1 to provide a desired output to a field and the armature of a pull motor PM in line 32 thus driving the pulling rollers 68 as shown in FIG. 1 at a desired rate of speed to draw tubing.

Closure of OS contacts in line 24 or US contacts in line 25 will energize relay TCR1 in line 24. Energization of relay TCR1 closes front contacts in line 47 to energize a reject solenoid RS connected to actuate a four-way valve FV1 in lines 48, 49 permitting air to flow from an air supply in line 50 to the rejector actuator RA in line 49. As long as an oversize or undersize diameter signal is present, the reject actuator RA tilts the second chute section 224 so that the tubing sections are diverted and directed to a cullet or waste area. When the tubing returns to tolerance the relay coil TCR1 is deenergized. However, it is advantageous to have a delayed drop-out of the TCR1 contacts so that the tubing produced between the gauging wheels 82 and the reject station is continued to be diverted until tubing of a desired diameter reaches the cutting and sealing mechanism 74.

When the diameter sensor DS senses an undersize diameter the undersize relay US is energized in line 23 closing front contacts US in lines 25 and 28. The closure of front contacts US in line 28 energizes a second field of the diameter control motor DM to drive the movable tap SRT of the signal resistor SR in the opposite direction to decrease the speed of the pull motor PM via the pull motor control PMC. This continues until the diameter is back within an acceptable range and the undersize relay coil US is deenergized.

The cutting and sealing motor control CMC is illustrated in line 38 and is connected to power leads L1 and L2 by the closure of switch CMS. The control CMC supplies an output to a field and an armature of the motor CM in line 40. The magnitude of that output may be manually set by the manual control knob MS2 so that the cutting and sealing mechanism 74 advances and processes tubing at a speed closely matched to the drawing speed of the tubing.

In line 33 a pulse generator PG is shown which is driven by the pull motor PM in line 32 to provide a pulse output which is indicative of the rate of speed of the pull motor PM. The pulse output from the pulse generator PG is fed through a frequency-to-direct-current converted FDC in line 34 to provide a direct current output which is proportional to the speed of the pull motor PM. The direct current output from the converter FDC is fed through a voltage divider network VD1 shown in lines 35 to 37 to the motor control CMC. The direct current signal modifies the speed of motor CM so that the tube advancement by the cutting mechanism 74 is substantially the same as the drawing speed of the tubing.

In FIG. 1 the tubing 58 is guided or conducted in a looped path 70 next to proximity sensors PS1 and PS2 supported on a frame portion or stand 90. The proximity sensors PS1 and PS2 are noted lines 43 and 44 of FIG. 14.

When the processing speed of the cutting and sealing mechanism 74 exceeds the drawing speed, the looped path 70 shortens and proximity sensor PS1 is actuated when the tubing loop is adjacent thereto to energize proximity relay PX1 in line 43. PX1 contacts close in line 42 to energize relay CR5 in line 41. CR5 contacts close in line 41 to hold the relay coil CR5 energized thus indicating that the speed of cutting and sealing mechanism 74 is too great, even though the loop then immediately backs away from the proximity sensor PS1. Contacts CR5 also close in line 36 in the voltage divider network VD1 to change the signal from the converter FDC to the cutting motor control CMC which reduces the processing speed of the sealing and cutting mechanism 74.

As the speed of mechanism 74 is reduced the looped path 70 gets lower until proximity sensor PS2 senses the looped path 70 and energizes proximity relay PX2 in line 44. Back contacts PX2 in line 42 open to deenergize relay CR5, open contacts CR5 in line 41 to break the holding circuit, and open contacts CR5 in line 36 to return the voltage divider network VD1 to its normal operation.

It is to be recognized that the scope of this invention includes direct control of the cutting and sealing mechanism motor CM by mechanisms which sense the actual drawing speed of the tubing 58 as opposed to that detailed in FIGS. 13 and 14. In this instance however, it was considered satisfactory to control the speed of the cutting and sealing mechanism motor CM by a signal from the pulling motor PM which indicates the general drawing rate of the tubing 58. However, because of slippage of the silicon rubber coated rolls 68 and other variables in the process, the speed of the pulling motor PM is not an absolute indication of the drawing speed even though rolls 68 are driven by a toothed timing belt TB1. Therefore, it was found most satisfactory to utilize the speed signal from the pulling motor PM for a coarse adjustment and the looped path sensing by the proximity switches PS1 and PS2 as a fine adjustment of the processing speed of the cutting and sealing mechanism 74.

A transformer T2 in line 45 supplies a stepped down control voltage to leads L5 and L6 for the control circuit in lines 46 to 57. The indexing rate of the conveyor 80 is accomplished by energizing a timer TM1 in line 54 by the closure of switch CS. The timer TM1 has front contacts in line 53 which, when closed, energize the conveyor solenoid CVS in line 53 to actuate a four-way valve FV2 in lines 51, 52. Actuation of four-way valve FV2 directs air from the air supply in line 50 to an index actuator INA and to a gate actuator GA.

The gate actuator GA as noted hereinbefore extends gate 252 between portions 226a and 226b of chute section 226 to temporarily hold and accumulate tube sections being discharged from the cutting and sealing mechanism 74. Actuation of the index actuator INA moves a full container 78 from a tube receiving position while indexing an empty container 78 into tube receiving position. The timing out of the timer TM1 in line 54 and the opening of TM1 contacts in line 53 signal that the indexing cycle is over and deenergizes conveyor solenoid CVS to stop the indexing action by actuator INA and to retract the gate 258 by the gate actuator GA.

The timer TM1 may be a manually set timer on a cyclic operation which is set for a time based upon operating experience. However, it is advantageous to provide a timer, the timing interval of which may be changed by a signal derived from the motor speed of the cutting and sealing mechanism 74. Such a signal may be derived by a pulse generator and converter as noted in lines 33 and 34 for the pull motor PM.

An electronic timer may have its timing interval varied by a signal circuit SS such as indicated in line 56 which is connected to the timer TM1 in line 54. Further, TCR1 back contacts may be connected in circuit between the speed signal circuit SS and the timer TM1 in line 55. Accordingly, when a reject signal is supplied by the relay TCR1 the back contacts TCR1 open in line 55 to interrupt the signal supplied which is defining the timing interval of timer TM1. Thus a reject operation will not interfere with the correct indexing time of the conveyor 80 since the indexing time is now responsive only to the productive processing rate of the cutting and sealing mechanism 74.

A vibrator control VB is shown in line 57 which may be energized by closure of switch VBS to initiate vibration of one or all of the sections of the tube chute conveyor 76.

It should be noted that individual portions of the apparatus shown are useful independently. This is particularly true with the cutting and sealing mechanism 74. The mechanism may receive tubing directly from the forming apparatus, from already formed coils of tubing, or from stocks of individual lengths of tubing. The loop sensors are useful in controlling the feeding speed whether the tubing is just formed or is being received from a coil.

In conclusion, it is pointed out that while the illustrated examples constitute practical embodiments of the various features of my invention, I do not limit myself to the exact details shown since modification of these details may be made without departing from the spirit and scope of this invention.

I claim:
1. A method of producing sections of thermoplastic tubing having their opposite ends sealed, comprising
    (a) moving a length of tubing in a predetermined arcuate path and clamping said length of tubing at spaced intervals along said arcuate path to exert a bending moment along the length of tubing, and
    (b) heating at least one localized zone of said tubing intermediate each of said clamping intervals by moving a plurality of spaced burners adjacent to and directed against the zones of said length of tubing to impart sufficient heat to enable severing of said tubing into sections and sealing of each end of each section in response to the bending moment exerted.
2. A method as defined in claim 1 which further includes
    (a) collecting said individual tubing sections by releasing said clamped sections and directing said sections to a packaging area,
    (b) measuring the diameter of said length of tubing, and
    (c) diverting said released sections from being directed to a packaging area when the measured diameter of said tubing is outside of a tolerance range of diameters.
3. A method as defined in claim 2 which further includes
    (a) performing said diameter measuring step before said tubing reaches said arcuate path, and
    (b) delaying the switch from diverting sections back to collecting sections after the diameter of said tubing returns to said tolerance range to permit the out of tolerance tubing between the diameter measuring point and the packaging area to be diverted.
4. A method as defined in claim 2 which further includes
    (a) providing a plurality of containers at a packaging area to receive tube sections,
    (b) indexing each of said containers into tube receiving position as a preceding filled container is indexed out of tube receiving position, and
    (c) temporarily collecting said tube sections between their release from clamping and delivery to said containers while a filled container is indexed out of and an empty container is indexed into tube receiving position.

5. A method as defined in claim 1 which further includes
   (a) drawing the length of tubing from a heated body of thermoplastic material, and
   (b) measuring the drawing speed of said tubing to control the speed of movement of said tubing through said arcuate path.

6. A method as defined in claim 5 which further includes
   (a) continuously feeding the tubing as it is drawn to said arcuate path, and
   (b) monitroing the length of tubing between the drawing and arcuate path sections to obtain a measure of the drawing speed to said tubing.

7. A method as defined in claim 5 which further includes
   (a) continuously feeding the tubing after it is drawn through a looped path to said arcuate path, and
   (b) monitoring the position of said looped path as a measure of drawing speed to control the speed of movement of said tubing through said arcuate path.

8. A method as defined in claim 1 which further includes
   (a) continuously feeding the tubing through a looped path from a supply of tubing to said arcuate path, and
   (b) monitoring the position of said looped path as a measure of tube feeding speed to coordinate feeding speed and the speed of movement of said tubing through said arcuate path.

9. A method of manufacturing tubing comprising
   (a) continuously drawing tubing from a heated body of thermoplastic material by pulling on the tubing with a rotating means,
   (b) driving a means for collecting the tubing after it leaves the drawing means,
   (c) guiding the tubing through a looped path between the drawing means and the collecting means,
   (d) monitoring the position of said tubing in said looped path as a measure of the relation between the drawing speed and the collecting speed of said tubing, and
   (e) controlling the speed of the collecting driving means in response to the position of the tubing in said looped path to coordinate the speed of the collecting driving means with the rate of delivery of tubing from the drawing means.

10. Apparatus for cutting a length of tubing into individual sections and sealing both ends of each section comprising,
    (a) means for holding a length of tubing in an arcuate path to exert a bending moment on the tubing,
    (b) means for heating spaced localized zones of said tubing along said arcuate path to melt the tubing at each zone to enable the tubing to separate at the zones into individual sections as the bending moment on the tubing pulls the tubing apart at each zone.

11. Apparatus as defined in claim 10 which further includes means for clamping portions of said tubing in said arcuate path zones at a position remote from the ends of each tubing portion to enable each tubing portion end to exert a bending moment independent from the bending moment exerted by the other end of a tubing portion.

12. Apparatus as defined in claim 10 in which
    (a) said means for holding a length of tubing in an arcuate path includes a wheel having a peripherally extending tube receiving surface, and in which
    (b) said heating means includes a plurality of burner heads carried by said wheel and positioned to provide an outwardly extending flame at each zone.

13. Apparatus as defined in claim 12 which further includes means for clamping said tubing in place on said peripheral surface between said zones.

14. Apparatus as defined in claim 12 in which said wheel has radially extending slots formed therein opening outwardly through said tube receiving surface to receive said burner heads.

15. Apparatus as defined in claim 14 which includes means for moving said burner heads into tube heating position in a slot after said tubing is in place on said surface.

16. Apparatus as defined in claim 15 which further includes means for moving a burner head out of tube heating position after said tubing has been severed by said burner head.

17. Apparatus as defined in claim 12 which further includes
    (a) a guide wall extending outwardly from and adjacent said tube receiving surface between each of said zones, and which further includes
    (b) clamping finger means carried by said wheel between each of said zones, and
    (c) means for moving each clamping finger means across said tube receiving surface to clamp said tubing between said finger means and said guide wall after said tubing has been received by said tube receiving surface.

18. Apparatus as defined in claim 17 which further includes means for moving said clamping finger means away from said guide wall to release a tubing section which has been severed by said burner heads.

19. Apparatus as defined in claim 12 which further includes
    (a) means for continuously drawing tubing from a heated body of thermoplastic material and feeding said continuous tubing to said wheel, and
    (b) means for rotating said wheel continuously to accept said continuous length of tubing.

20. Apparatus as defined in claim 19 which further includes
    (a) means for conducting said tubing in a looped path from said drawing means to said wheel,
    (b) means for monitoring the position of said looped path to obtain a measure of the drawing speed of said tubing, and
    (c) means responsive to said monitoring means for controlling the speed of said rotating means.

21. Apparatus as defined in claim 19 which further includes
    (a) means for measuring the diameter of said tubing after drawing, and
    (b) means responsive to said diameter measuring means for rejecting tubing sections when the diameter of the tubing is outside of a desired range of acceptable diameters.

22. Apparatus as defined in claim 19 in which
    (a) said drawing means includes pulling roll means, and which further includes
    (b) means for measuring the diameter of tubing drawn by said pulling roll means, and
    (c) means responsive to said diameter measuring means for controlling the speed of said pulling roll means.

23. Apparatus as defined in claim 22 which further includes means responsive to the speed of said pulling roll means for controlling the speed of said wheel rotating means.

24. Apparatus as defined in claim 23 which further includes
    (a) means for guiding said tubing in a looped path between said pulling roll means and said wheel, and
    (b) means for monitoring the position of said looped path to obtain a measure of the actual drawing speed of said tubing and modifying the speed of said wheel rotating means accordingly.

25. Apparatus as defined in claim 12 which further includes
(a) means for clamping said tubing in place on said peripheral surface between said zones after the tubing is received on the surface and before said tubing is separated into sections,
(b) means for releasing said clamping means after said tubing has been separated into sections, and
(c) means for collecting said sections.

26. Apparatus as defined in claim 25 in which said collecting means includes
(a) means for receiving said sections and conveying them to a packaging area, and
(b) finger means disposed adjacent said peripheral surface of said wheel for deflecting said sections from said wheel to said conveyor means.

27. Apparatus as defined in claim 25 in which said collecting means includes tube chute means having a chute section operable in response to a detection of an incorrect tubing diameter for diverting tubing sections to a waste area.

28. Apparatus as defined in claim 25 in which said collecting means includes
(a) means for receiving tubing sections from said wheel and moving said sections to a packaging area, and
(b) conveyor means for carrying a plurality of individual packages to receive tube sections.

29. Apparatus as defined in claim 28 in which
(a) said conveyor means is operable to index a full package out of a tube section receiving position while indexing an empty package into receiving position, and which further includes
(b) means for temporarily holding tube sections on said tube receiving and moving means while said conveyor means is indexing packages.

30. Apparatus as defined in claim 29 which further includes means responsive to the rate of tube section production for enabling the indexing operation of said conveyor means.

References Cited

UNITED STATES PATENTS

| | | | |
|---|---|---|---|
| 2,272,105 | 2/1942 | Anastor | 65—108 X |
| 3,150,953 | 9/1964 | Modelle | 65—110 X |
| 3,462,255 | 8/1969 | Couquelet | 65—108 X |
| 2,958,160 | 11/1960 | Cooke et al. | 65—163 X |

ARTHUR D. KELLOGG, Primary Examiner

U.S. Cl. X.R.

65—163, 165, 187